Feb. 14, 1956  W. SCHAELCHLIN ET AL  2,735,057
ELECTRICAL SYSTEM FOR MOTOR LOAD CONTROL
Filed April 12, 1952  6 Sheets-Sheet 1

INVENTORS
Walter Schaelchlin,
Charlton H. Storey, Jr.
Gerald E. Mathias.
BY
Paul E. Friedemann
ATTORNEY Feb. 14, 1956   W. SCHAELCHLIN ET AL   2,735,057
ELECTRICAL SYSTEM FOR MOTOR LOAD CONTROL
Filed April 12, 1952   6 Sheets-Sheet 2

INVENTORS
Walter Schaelchlin, Charlton H. Storey, Jr.
& Gerald E. Mathias.
BY Paul E. Friedemann
ATTORNEY Feb. 14, 1956  W. SCHAELCHLIN ET AL  2,735,057
ELECTRICAL SYSTEM FOR MOTOR LOAD CONTROL
Filed April 12, 1952  6 Sheets-Sheet 4

WITNESSES:
Robert C. Baird
E. F. Oberhein

INVENTORS
Walter Schaelchlin, Charlton H. Storey, Jr.
& Gerald E. Mathias.
BY
Paul E. Friedemann
ATTORNEY Feb. 14, 1956 W. SCHAELCHLIN ET AL 2,735,057
ELECTRICAL SYSTEM FOR MOTOR LOAD CONTROL
Filed April 12, 1952 6 Sheets-Sheet 5

WITNESSES:
Robert C. Baird
C. L. Oberheim

INVENTORS
Walter Schaelchlin, Charlton H. Storey, Jr.
& Gerald E. Mathias.
BY
Paul E. Friedemann
ATTORNEY Feb. 14, 1956   W. SCHAELCHLIN ET AL   2,735,057
ELECTRICAL SYSTEM FOR MOTOR LOAD CONTROL
Filed April 12, 1952   6 Sheets-Sheet 6

WITNESSES:
Robert A. Baird
C. F. Oberhein

INVENTORS
Walter Schaelchlin,
Charlton H. Storey, Jr.
& Gerald E. Mathias.
BY
Paul E. Friedemann
ATTORNEY

United States Patent Office

2,735,057
Patented Feb. 14, 1956

2,735,057

ELECTRICAL SYSTEM FOR MOTOR LOAD CONTROL

Walter Schaelchlin and Charlton H. Storey, Jr., Buffalo, and Gerald E. Mathias, Williamsville, N. Y., assignors to Westinghouse Electric Corporation, East Pittsburgh, Pa., a corporation of Pennsylvania Application April 12, 1952, Serial No. 281,956

12 Claims. (Cl. 318—241)

This invention relates generally to electrical control apparatus and systems for electric motors, and more in particular to such systems and apparatus which are utilized in the control of wound rotor induction motors.

Slip regulators have been used for many years in applications involving electric motors of the wound rotor induction type, which were of high horsepower rating. Examples of this appear in steel mill applications where such motors are applied in blooming mill drives. In such applications, the heavy impact load peaks of the mill motors would result in excessive power surges in the absence of some form of regulation, and it is in this connection that slip regulators have found their more extensive use.

Control apparatus and systems of this general type usually embody a rheostat of the liquid type which is connected to the motor secondary system and controlled in such a way as to increase the secondary resistance as the load current increased above a predetermined level, and to reduce the secondary resistance as the load current decreases.

As a general rule, a torque motor was utilized to control the moving electrodes of such liquid rheostats. Since the systems involved were of fairly large horsepower, the moving electrode system usually represented an appreciable mass. The function of the torque motor in such installations was simply that of rotating a substantially balanced mechanical system through a small angular displacement sufficient to move the electrodes in the required amount. In view of the inertia of such a drive, the torque motors were of fairly large capacity, for example, in many applications, of the order equivalent to 75 horsepower.

Arrangements of this general type, while they proved reasonably satisfactory in operation, nevertheless had the disadvantage of being cumbersome and quite heavy. Moreover, the character of the regulator was not simple and did not offer the fineness of control which could be obtained with other types of servo arrangements.

The liquid rheostats in such installations were usually operated by means of a set of cables connected to the moving electrode support bar and which passed over suitable control arms which were connected to the torque motor shaft. The cable on the end opposite from that at which it was connected to the support bar was usually provided with a counterweight which tended to counterbalance the load of the moving electrode system. With an arrangement such as this, the separation of the electrodes by withdrawal of the moving electrode could be accomplished at whatever rate the capacity of the torque motor could provide. However, in the opposite direction, that is in the direction in which the moving electrode was advanced toward the stationary electrode, the movement together could be accomplished only under the acceleration of gravity. As a consequence, a serious limitation existed in the speed of adjustment with which resistance could be removed from the secondary system of the motor.

This invention is directed to a solution of the aforesaid and other problems inherent in slip regulator controls and has for one of its objects the provision of a slip regulator system which is simple with respect to operational requirements and positive in operation.

Another object of this invention is to provide a slip regulator system for an induction motor in which the speed of response and the speed of correction is increased.

A further object of this invention is to provide a slip regulator of the character referred to in which a control of the secondary resistance of the motor is obtained in dependence of motor current and in dependence of the position of the moving electrode with respect to the stationary electrode.

Further to the preceding object, it is an object of this invention to provide a slip regulator of the character referred to in which a relatively small pilot motor may be utilized to drive the moving electrodes of the liquid rheostat.

In improving the performance of slip regulators involving liquid rheostats, this invention contemplates certain improvements in the liquid rheostat per se. Accordingly, it is another object of this invention to provide a liquid rheostat in which the operating efficiency of such a rheostat is raised.

It is also an object of this invention to provide a liquid rheostat in which the moving electrode is power operated in both directions of movement.

A specific object of this invention is to provide a liquid rheostat assembly in which the moving electrodes are carried upon a common support and provided with individual adjustments so that each moving electrode may be easily adjusted to occupy a position parallel with respect to its associated stationary electrode and that the respective electrodes may be spaced equal distances apart so that the separate circuit resistances may be made equal.

The foregoing statements are merely illustrative of the various aims and objects of this invention. Other objects and advantages will become apparent from a study of the following disclosure when considered in conjunction with the accompanying drawings, in which:

Fig. 1 is a diagrammatic illustration of a slip regulator system embodying the principles of this invention;

Figs. 2 and 3, taken together, show a side elevational view of a liquid rheostat assembly embodying the principles of this invention;

Figure 1:
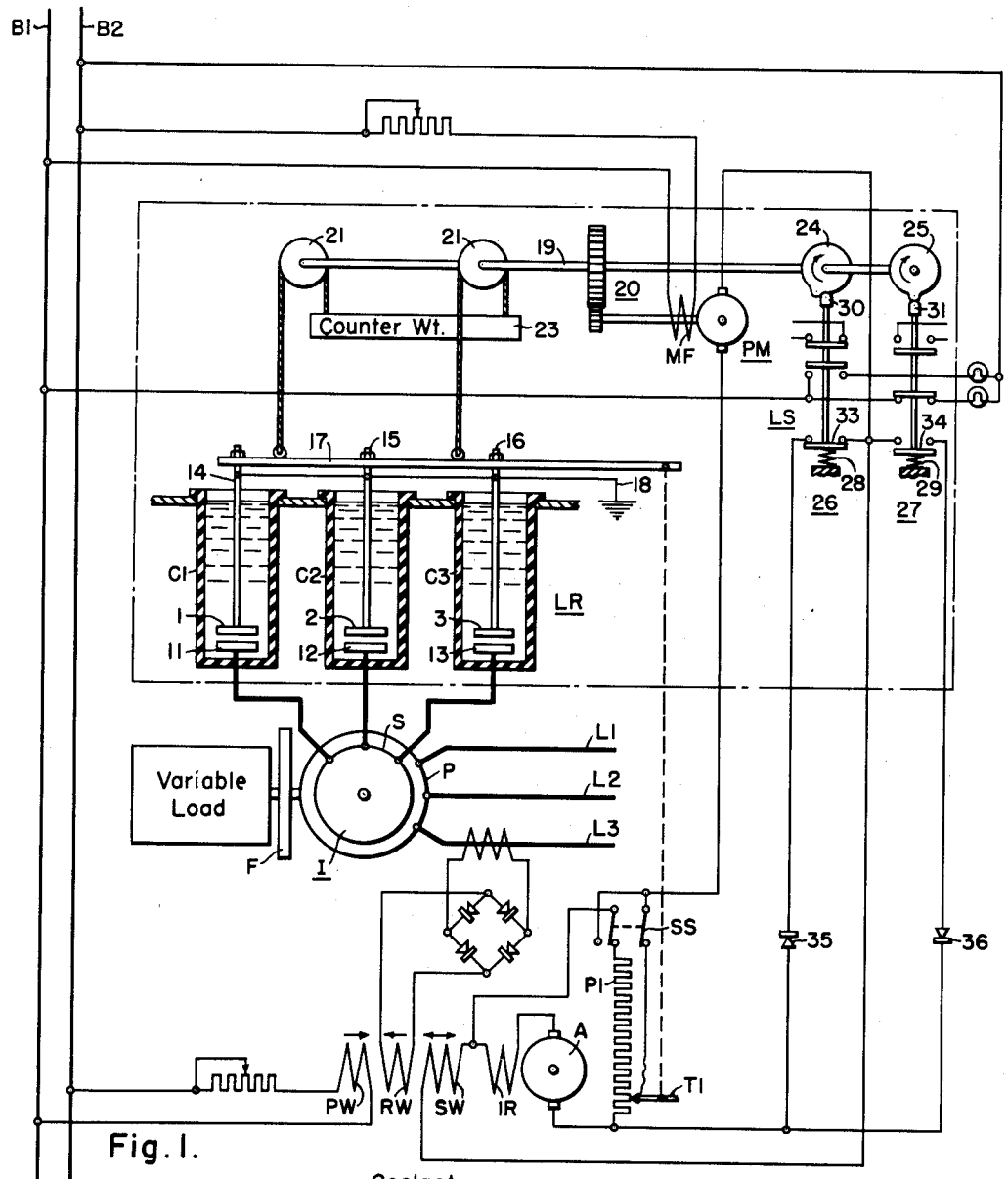

Referring now to Fig. 1, and induction motor I of the wound rotor type is connected to drive a variable load. This induction motor is provided with a primary winding designated P adapted for connection to a three phase supply of alternating current through the conductors L1, L2, and L3. The secondary winding S of this induction motor is connected to a liquid rheostat, generally designated LR, which is utilized to control the resistance of the secondary winding circuit of the induction motor to thereby control its speed.

The liquid rheostat is comprised of three separate cells designated C1, C2 and C3. Each of these cells is filled with a suitable electrolyte, such as sodium carbonate solution, which is adapted to carry current from the respective moving electrodes 1, 2 and 3 to the respective stationary electrodes 11, 12 and 13, which latter are respectively connected to the separate phases of the secondary winding circuit of the induction motor. The moving electrodes are connected by means of conducting rods 14, 15 and 16, respectively, to a supporting bar 17 which mechanically connects the moving electrode assemblies together for simultaneous movement. A conductor 18, which is grounded electrically, connects the three conducting rods together, forming a grounded neutral for the circuit.

Supporting bar 17 is actuated by a drive which is powered by a pilot motor, generally designated PM. This pilot motor is connected to a shaft 19 through a reduction gear drive, generally designated 20. Shaft 19 is provided with a pair of sprockets or cable wheels 21 over which the cables 22, which are connected to symmetrically spaced points on the supporting bar, are disposed. The ends of cables 22 are connected to a counterweight 23 which partially balances the load of the moving electrode assembly. Shaft 19 is also connected to operate a limit switch assembly, generally designated LS. This limit switch assembly is operated by a pair of cams 24 and 25, respectively, which operate the respective limit switch stacks 26 and 27. These respective stacks are biased by compression springs 28 and 29 in a direction such that the cam followers 30 and 31 thereof remain in continuous engagement with the respective cams. The primary function of these limit switches, as will be hereinafter apparent, is to limit the rotation of the pilot motor in one direction and to simultaneously establish a circuit for reversing the direction of rotation of the pilot motor when the limit of movement in one direction has been reached.

As earlier noted in this description, the control of the pilot motor, which drives the moving electrode, is obtained as a function of the primary current of the induction motor I, and as a function of the position of the moving electrodes of the liquid rheostat with respect to the stationary electrodes thereof. This control is obtained through a suitable amplifying device which may be either of the static type or the rotating type. In this illustration, a dynamoelectric machine type of amplifier, designated A, is employed. Amplifier A is a direct current generator which is provided with an IR compensating winding, designated IR; a shunt connected winding, designated SW; a regulating winding, designated RW; and a pattern or reference winding, designated PW. As indicated by the arrows adjacent the respective windings PW and RW, the ampere turns of these windings are opposed. The arrangement is such that if the ampere turns of one of the windings predominates that of the other, the output of the amplifier generator A will be of a direction and magnitude corresponding to the magnitude and direction of the unbalance in ampere turns. The output of this generator for normal operation is applied through a selector switch, designated SS, across a potentiometer, designated P1. The movable tap T1 of this potentiometer is driven by the moving electrode assembly of the liquid rheostat and is electrically connected to one terminal of the pilot motor PM through the righthand blade of selector switch SS. The other terminal of the pilot motor is connected through parallel branches of the limit switches to the lower terminal of the potentiometer P1, as viewed. These parallel branches, respectively, include limit switch contacts 33 and 34 and respective polarizing rectifiers 35 and 36.

In the second position of the selector switch SS, potentiometer P1 is disconnected from the pilot motor circuit. With this arrangement, the armature of the amplifier generator A is connected directly across the pilot motor armature to provide high speed positioning of the moving electrodes.

Prior to starting of the system, the moving electrodes 1, 2 and 3 will be spaced their maximum distance from the respective stationary electrodes. When it is desired to start the induction motor I, power is applied to the direct current control buses B1 and B2, which supply D. C. excitation to the pattern winding PW of the amplifier generator A and to the field winding MF of pilot motor PM. At that time, the system is ready for connection of the induction motor I to a supply of three-phase power represented in conductors L1, L2 and L3. The switching circuits, whereby such connections may be effected, have not been illustrated in the interest of simplicity, since any conventional switching arrangement may be utilized. The induction motor with this arrangement is therefore started with maximum resistance in the secondary winding circuit, and the motor begins to accelerate the load connected thereto. The amplifier generator A which, at this instant, is primarily operating under the influence of the ampere turns of the pattern winding, produces its maximum output. At this time the tap T1 of potentiometer P1 is positioned in its uppermost position since it is connected to and driven by the supporting bar of the moving electrode system of the liquid rheostat. In this position of the moving electrodes, the cams 24 and 25 will be displaced substantially 360° from the angular positions indicated, in which case, cam 24 will actuate limit switch 26 to its open position and cam 25 will permit limit switch 27 to move to its closed position under the influence of compression spring 29. Thus, the contacts 33 are open, and contacts 34 are closed so that energization of the pilot motor PM in a sense to drive the cams clockwise, as viewed, will have been interrupted. The polarity of amplifier generator A under the influence of the ampere turns of the pilot motor is such as to cause a current to flow through the pilot motor armature, through the switch 34, which is closed for this assumed condition of operation, through rectifier 36 and back to the bottom side of the potentiometer P1. The pilot motor now drives cams 24 and 25 in a counterclockwise direction, as viewed, and begins to lower the moving electrodes 1, 2 and 3 of the liquid rheostat. This lowering of the electrodes progressively reduces the resistance of the secondary circuit of the induction motor and, as a consequence, the motor tends to speed up. As the accelerating torque increases, the primary current of the motor rises, and the ampere turns of the regulating winding RW, which are opposed to those of the pattern winding PW, build up. This operation continues until such time as the differentially related ampere turns balance one another at which time the output of the amplifier generator A decreases to zero. During this operation of the moving electrodes towards the stationary electrodes of the liquid rheostat, it will be appreciated that the tap of potentiometer T1 is being moved downwardly, as viewed. Thus, a proportionally smaller voltage in dependence of the position of the moving electrodes with respect to the stationary electrodes, is applied to the armature of the pilot motor, tending to decrease its speed of operation.

When the cams 24 and 25 are moved counterclockwise from the position they first occupied in which contacts 34 were closed and contacts 33 were opened, the contacts 33 closed and contacts 34 remained closed. Thus, parallel branch circuits are established for the application of voltage to the pilot motor armature, of one polarity or the reverse, depending upon the polarity of output of the amplifier generator A.

If during this period of acceleration of the motor the load current should rise above predetermined limits, the ampere turns of the regulating winding RW will overbalance those of the winding PW and result in a reduction or reversal in output of the amplifier generator A. This current will now flow through rectifier 35 and the now closed limit switch 33 to the upper terminal of the pilot motor armature, and thence back to the tap of the potentiometer P1. This momentarily retards or reverses the direction of rotation of the pilot motor to reduce the speed of the moving electrodes or if the motor reverses to move the electrodes further apart and increase the secondary circuit resistance of the induction motor. At such time as the primary current of the induction motor drops below the mentioned predetermined limit, the pilot motor will stop and reverse its direction of rotation to again advance the moving electrodes. This is due to the fact that the ampere turns of the pattern winding again predominate to reverse the polarity of output of the amplifier generator. This operation continues throughout the starting cycle of the motor until such time as the motor is brought up to its operating speed.

In blooming mill drives it is desirable to connect a flywheel such as F in the drive between the motor and the variable load so that the stored energy in the flywheel may be transferred to the load to help carry the load during intervals of peak mechanical loads. The current limit function is similar to that described earlier in this description during these peak load periods and will control electrode spacing to prevent electrical overload. However this limits motor output torque which might result in a drop in speed but in this interval the stored energy of the flywheel is given up to the load to help drive the load.

The provision of potentiometer P1 in the load circuit of the amplifier generator A, having a tap which is driven in dependence of movement of the moving electrode system of the liquid rheostat, tends to minimize hunting of the system, by producing a correction in which the magnitude of the error quantity is scaled in relation to the electrode separation. Thus, when the electrodes are closely positioned, as illustrated, the magnitude of the output voltage of the amplifier generator, which is applied to the armature of the pilot motor PM, is small, and when the electrodes are spaced further apart, the voltage which is applied to the armature of the pilot motor will be increased correspondingly to cause more rapid movement.

From the foregoing discussion and the illustration of Fig. 1, it will be appreciated that a control has been provided affording numerous advantages over a control in which a motor such as PM, is utilized as a torque producing means limited to small angular displacements as hereinbefore described. A system, such as that herein disclosed, in addition to involving much smaller rotating equipment, offers a fineness of control and a degree of sensitivity which is not achievable with the more cumbersome type of control aforesaid.

Although a control, such as that herein disclosed, is adequate in a drive of the type described, further improvements and refinements are achievable with a liquid rheostat assembly, such as illustrated in Figs. 2 through 8. An important difference between this liquid rheostat assembly and that schematically illustrated in Fig. 1, resides in the provision of a moving electrode drive which is effective to drive the moving electrodes both upwardly and downwardly. This feature, together with other novel features, will be appreciated from a specific consideration of Figs. 2 through 7.

Figure 2:
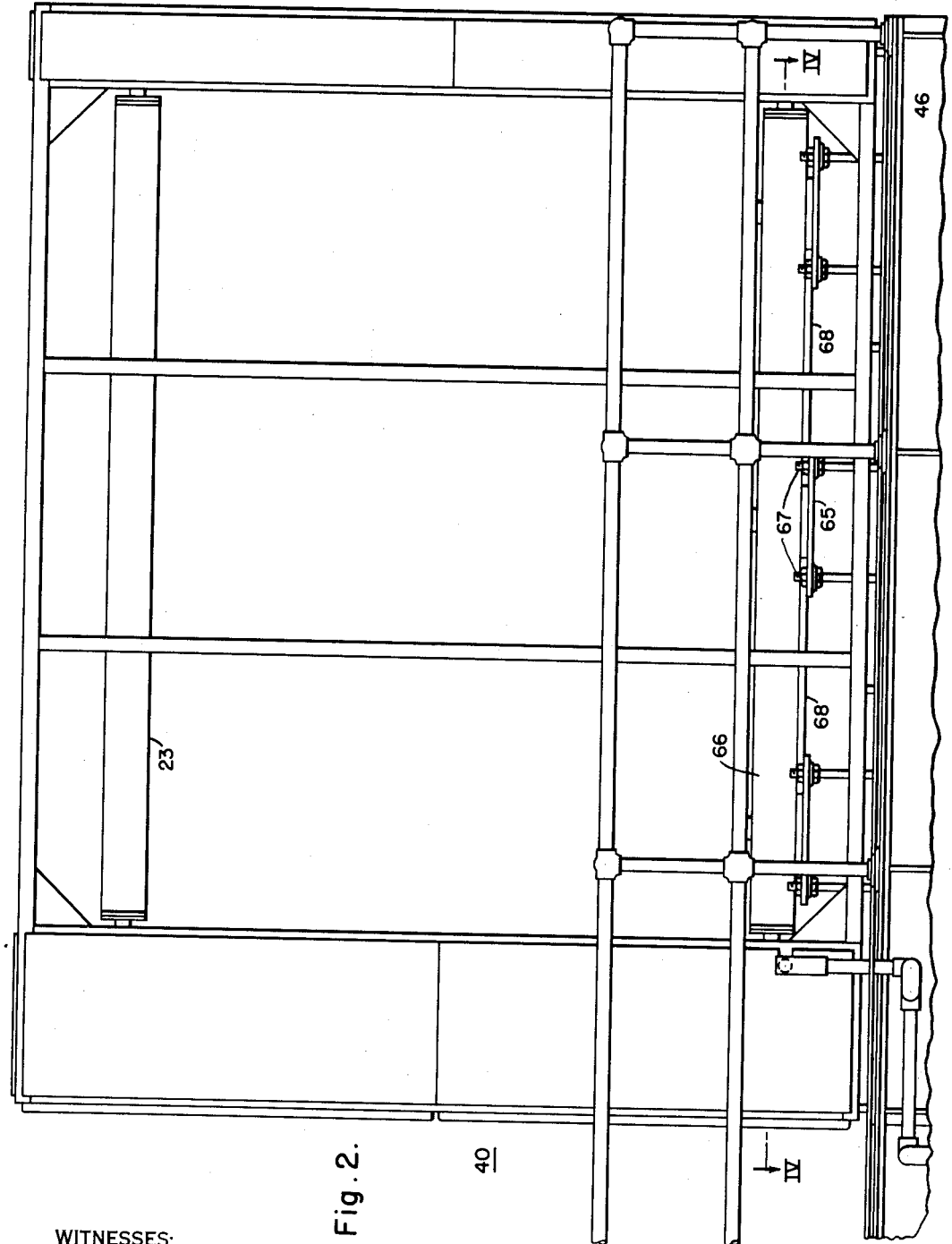
Figure 3:
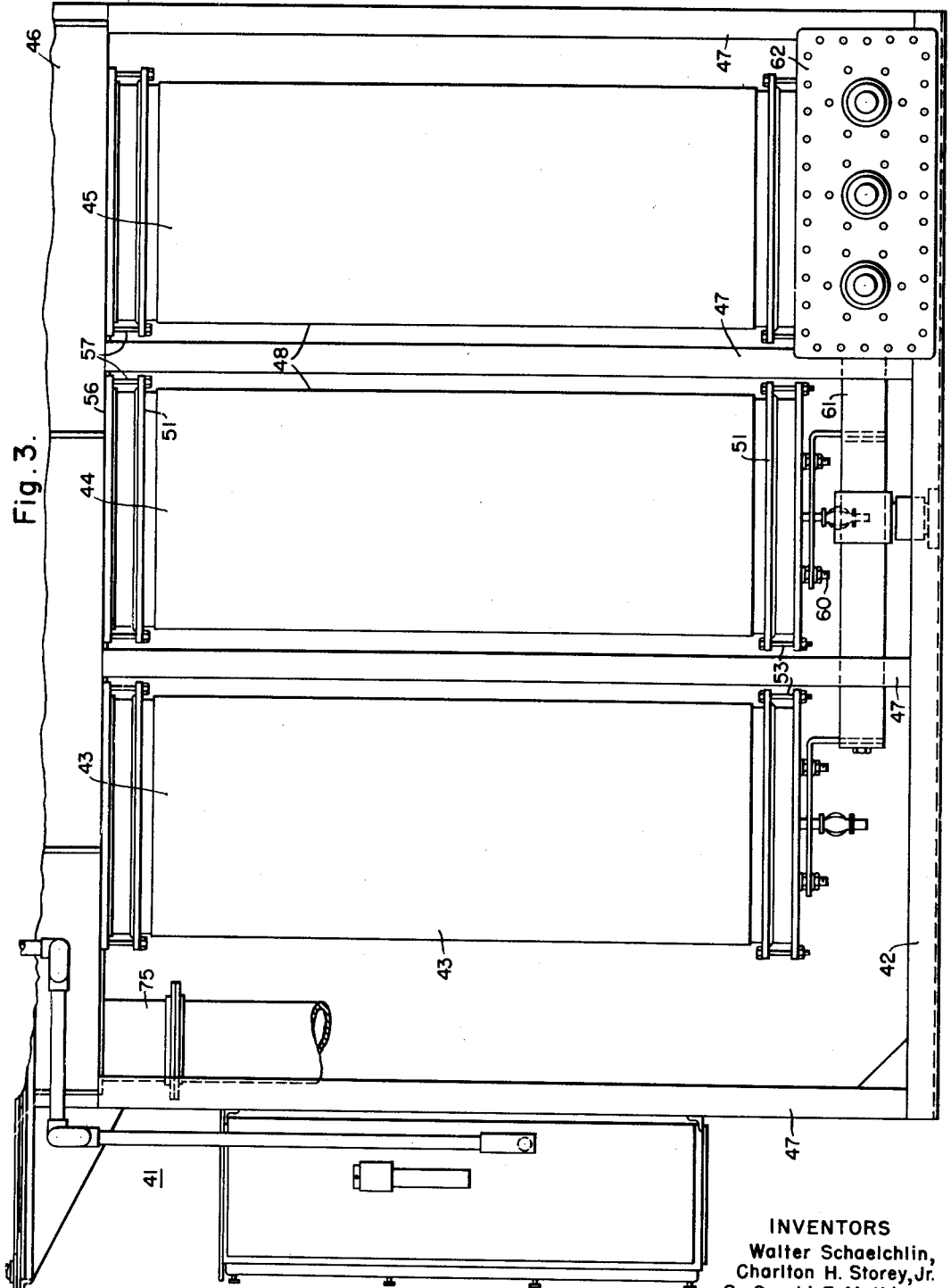
Figure 5:
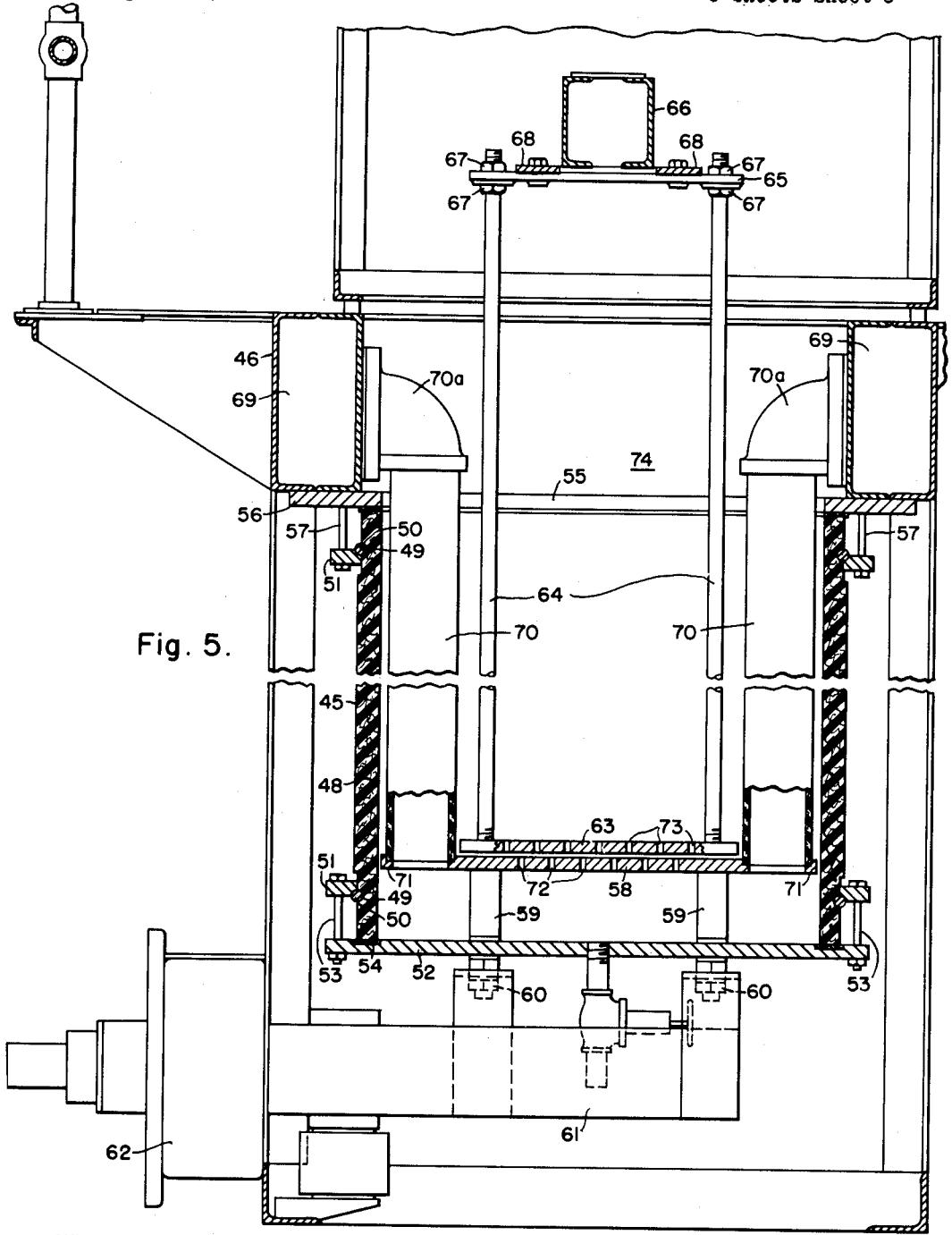
Fig. 5 is an enlarged vertical sectional view of the right hand tank of Fig. 3.

Referring to Figs. 2 and 3, the improved liquid rheostat assembly comprises an upper framework, generally designated 40, and appearing in Fig. 2, and a lower frame appearing in Fig. 3, and generally designated 41. The lower frame comprises three cylindrical cells 43, 44 and and 45, which are supported from an overhead platform 46 which is carried by a plurality of vertical columns 47 which are secured to a common fabricated base plate 42. The respective cells 43, 44 and 45 are identical in construction, and the sectional view illustrated in Fig. 5 will illustrate their respective details. In the construction of Fig. 5, it will be seen that each cell comprises a cylindrical shell portion 48, of electrical insulating material, provided with circumferential grooves 49 adjacent the respective ends thereof. A ring of circular cross-section, designated 50, is fitted into each circumferential groove, and a clamping ring 51, which fits about the cylinder, rides against the respective rings. Clamping ring 51 at the bottom of the cylindrical shell is utilized to secure the bottom sealing plate 52 by means of the clamping bolts 53. This bottom plate 52 is provided with a groove in the upper face thereof into which a gasket 54, which rides against the bottom edge of the shell 48, is fitted to form a fluid-tight joint at this point. The upper end of cylindrical shell 48 seats on a gasket about an opening 55 in a plate 56. The assembly is secured at the upper end by bolts 57, which extend through the clamping ring into the plate 56.

The stationary electrode 58 is supported upon four current conducting supports, two of which are illustrated at 59 in Fig. 5. The assembly is secured by means of bolts 60 which are connected with the supports and the stationary electrode 58. This mounting forms a liquid tight joint with bottom plate 52 and serves as a means for conducting current from the stationary electrode 58 to a point outside the cell. Suitable bus bar connections, illustrated generally at 61, are connected with the respective bolts 60 and terminate in a suitable electric outlet connector, generally indicated at 62, affording a point of convenient connection of the secondary circuit of the motor with the liquid rheostat.

Shell 48 is made of an asbestos cement which is impregnated with tung oil. It is not affected by the electrolyte and has a physical strength which is more than adequate for the application. Clamping stresses are minimized by the clamping rings. The use of insulating material in the shell electrically insulates plate 52 from plate 56. Bottom plate 52 is electrically "hot." Since this plate is supported from the top, no insulating problem is presented and high secondary voltages (7500 v.) on the motor can be used without an insulation problem. This is an important advantage of this type of cell construction because the use of high voltage permits a lower current for given motor horsepower and reduces the physical size of the electrode and consequently of the rheostat.

Movable electrode 63 is supported at the bottom end of four conducting rods or bars, two of which appear in Fig. 5 and are designated 64. These rods extend upwardly through the opening 55 in the cell at which point they connect to a plate 65 which is connected to the bottom side of a moving electrode supporting bar, generally designated 66. Plate 65 is better illustrated in Fig. 4 and appears as a substantially H-shaped member having holes in each of its four corners. The connection of the bars 64 to the plate 65 is accomplished by threading the upper ends of the respective bars and making the connection to the plate with contact type nuts 67. This type of connection is utilized for the bars supporting each of the moving electrodes, and an electrical connection between each of the plates, such as 65, is made by means of the current conducting straps 68, which extend from one end plate 65 to the plate 65 at the opposite end of the cell assembly. These straps and/or plates may be grounded in any suitable manner to form a grounded neutral for the secondary circuit of the motor connected to the liquid rheostat.

Referring again to Fig. 5, provision is made for introducing the electrolyte to each of the cells by means of fluid conducting ducts 69 which are disposed along opposite sides of the cells and extend throughout the length of the framework. These ducts are formed of oppositely disposed channel members having their confronting edges connected in fluid-tight relation, as by welding or brazing. Each duct assembly is secured to the upper side of plate 56 to be supported thereby. At each cell, inlet pipes 70 of insulating material are connected to the respective ducts by elbows 70a and project downwardly in the cell to the stationary electrode 58. The stationary electrode is provided with suitable lateral extensions 71, at diametrically opposite points, having holes therein which receive and secure the bottom ends of the inlet pipes 70.

Figure 8:
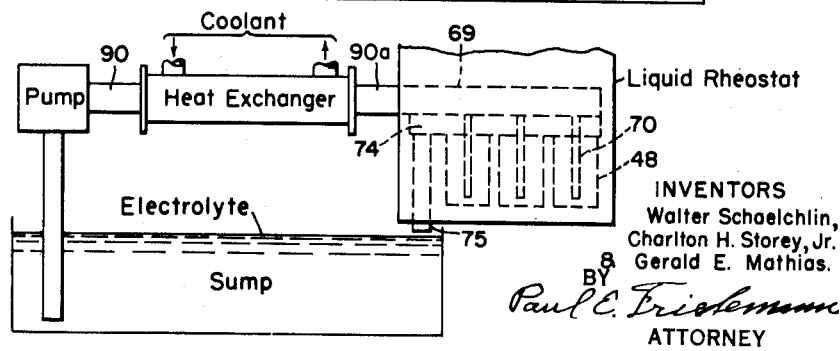
Fig. 8 is a schematic illustration of the complete fluid system for circulating the electrolyte.

The complete arrangement for the circulation of fluid is schematically shown in Fig. 8 and includes a sump tank, a pump, which pumps the electrolyte from the sump, a heat exchanger having an inlet pipe 90 connected to the pump and an outlet pipe 90a connected to both of the fluid conducting ducts 69. With this arrangement, the electrolyte is pumped from the sump through the pump and the inlet pipe into the heat exchanger. As the electrolyte flows through the heat exchanger to the heat exchanger outlet pipe, the electrolyte is cooled, and then fed into the ducts 69. From the ducts 69, the fluid flows through the inlet pipes 70 (see Fig. 5) into the respective cells down to the bottom of the cells and then upwardly through holes 72 and 73, respectively, in the stationary and moving electrodes, up to and over the top of the respective cells into the space or trough designated 74, which lies between the ducts, and above the upper plate 56. From this point, the electrolyte flows to an outlet pipe 75 in the liquid rheostat which extends downwardly from the trough, as seen in Fig. 3, and empties into the sump (see Fig. 8) to complete the circulating system for the electrolyte.

Figure 4:
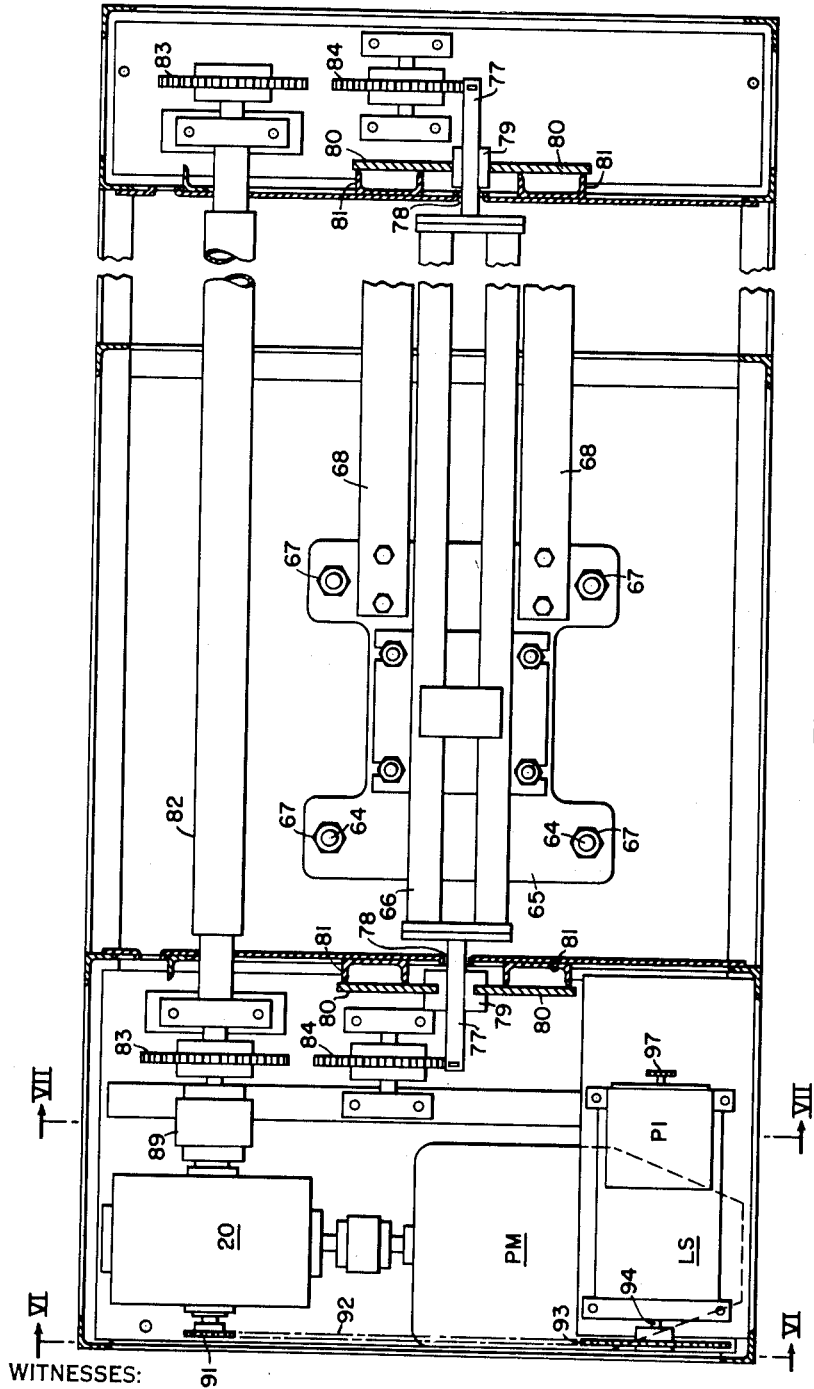
Fig. 4 is an enlarged fragmentary top view, with certain parts broken away, of the structure illustrated in Figs. 2 and 3.

Supporting bar 66, which carries the moving electrode assemblies for the respective liquid rheostat cells, is provided with suitable extension arms 77 at each end thereof, as best seen in Fig. 4, which extend through suitable slots 78 provided in the end walls of the housing for the operating mechanism. At each end, the extension arms 77 are fitted with guides 79 which engage the confronting edges of tracks 80 supported by means of channels 81 which in turn are secured to the end walls of the housing. These guides are of rigid construction to assure movement of the support bar 66 along a predetermined path and to minimize the possibility of angular displacement of the support bar assembly.

Figure 7:
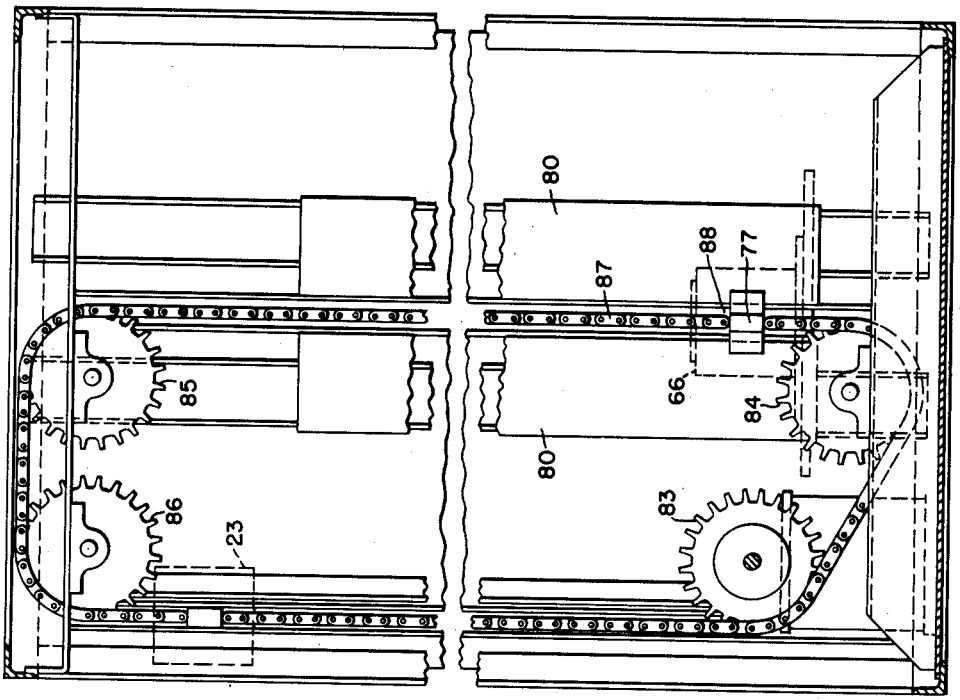
Fig. 7 is a sectional view taken on the line VII—VII of Fig. 4.

The extremities of extension arms 77 are connected to an endless chain drive of the type illustrated in Fig. 7. This drive comprises a system of four sprockets 83, 84, 85 and 86, the axes of rotation of which define the four corners of a quadrilateral. An endless chain 87 is positioned about the four sprockets, and the extension arms 77 are connected at corresponding points, such as 88, to the respective chains, as illustrated in Fig. 7, so that both ends of this arm may be actuated simultaneously in the same amount. This chain drive system is operated by means of a pilot motor designated PM, such as that which is illustrated in Fig. 1. The system is substantially mechanically balanced by weight 23 connected between the chains on the side of the sprockets opposite support bar 66.

Figure 6:
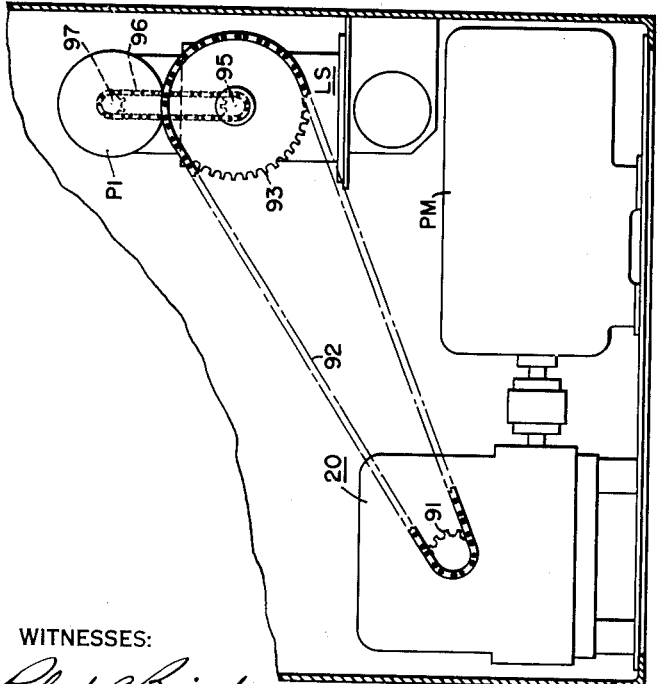
Fig. 6 is a sectional view taken on line VI—VI of Fig. 4 of the drive for the moving electrodes of the liquid rheostat and for other control devices of the system.

The pilot motor is illustrated in Fig. 6 and is mounted in the upper framework of the liquid rheostat assembly. The pilot motor shaft is connected directly to a reduction gear unit, generally designated 20, corresponding to that designated 20 in Fig. 1. The output of this reduction gear drive is connected through a suitable coupling 89 directly to the shaft on which the sprocket 83 is mounted. The sprocket shaft, as seen in Fig. 4, is designated 82 and extends from one end of the unit to the other, having mounted on its right-hand end a second sprocket, designated 83, corresponding to that on the left-hand end and forming part of a second sprocket drive similar to that on the left-hand end of the unit which drives the extension arm 77 at the right-hand end of the unit. The reduction gear drive 20 is also utilized to drive a sprocket 91, as seen in Fig. 4, which is connected by means of a chain 92 to a sprocket 93 which drives the shaft 94 of the limit switch unit, generally designated LS. This unit corresponds to the unit LS of Fig. 1. Shaft 94, at the opposite end of the limit switch housing from that on which the sprocket 93 is mounted, connects with another sprocket 95 connected by a chain 96, see Fig. 6, to a sprocket 97, which is utilized to drive the tap T1 of a potentiometer unit P1 of the type illustrated in Fig. 1. As in the arrangement of Fig. 1, substantial balancing of the mass of the moving electrodes is achieved by mass 23 (see Fig. 7) supported between the chains.

Reviewing this construction in connection with the arrangement illustrated in Fig. 1, the output of the amplifier generator A is applied to the potentiometer P1, the voltage across which is utilized to energize the armature winding of the pilot motor PM, the field winding of which is constantly excited. The pilot motor PM therefore drives the reduction gearing unit 20 to effect operation of sprocket 83 in the required direction, which in turn operates the supporting bar 66 which carries the movable electrodes of the three cells upwardly or downwardly, as required. The output of the reduction gear drive 20 is also effective to drive the sprocket 91, which through chain 92 drives sprocket 93 which operates the limit switches, generally indicated at LS. Rotation of the limit switch cam shaft by sprocket 93 results in operation of sprocket 95, which through chain drive 96 operates the sprocket 97 to control the potentiometer P1, completing the control loop for the system, as described in connection with Fig. 1. It will thus be seen that the system herein disclosed in Figs. 2 through 7 is directly insertable in the system illustrated in Fig. 1 in place of the schematically illustrated liquid rheostat assembly therein shown.

There are several features in this construction which measurably improve the operation of the system, such as shown in Fig. 1, and which make it possible to reduce the size of a liquid rheostat assembly for a given rating when compared with prior art constructions. Importantly among such features is the provision of the drive for the movable electrodes which affords a power drive of the electrodes, both upwardly and downwardly. This permits much more rapid regulation of the secondary circuit resistance in both directions since no longer is it necessary to depend upon gravity to pull the moving electrode down through the electrolyte. Thus, the system stiffness can be increased, and as a result, the sensitivity measurably improved so that excursions of the variable current beyond the predetermined limit, which is desired, may be minimized to an appreciable extent. Moreover, by providing a drive of this type, it is feasible to increase the rate of flow of the electrolyte through the system, since the force of the electrolyte, as it flows upwardly through the cell after being admitted at the bottom, acting on the moving electrode, will not appreciably interfere with movement of the electrode. By increasing this rate of flow of the electrolyte, the electrolyte efficiency is increased since there is always a higher concentration of cool electrolyte in the current carrying region. Still further, since the electrolyte can be cooled more conveniently with the higher flow rate, it is feasible to reduce the sizes of the respective moving and stationary electrodes of the system and thereby reduce the overall size of the liquid rheostat for a given rating.

An ancillary feature of this construction is apparent in the manner in which the moving electrodes are supported by the support bar 66. In this construction, the respective moving electrodes may be positioned substantially parallel or exactly parallel to the stationary electrode by the simple expedient of adjusting the contact nuts 67 at the upper ends of the four bars supporting the respective moving electrodes. Additionally, the electrode gaps at minimum electrode separation can be made exactly equal with this arrangement assuring balanced phase resistance, and it is to be noted that all of these corrections are conveniently made from the platform of the upper framework of this assembled unit.

Although but one complete system and one specific embodiment of the liquid rheostat have been herein illustrated, it will be appreciated by those skilled in the art that numerous other changes may be made, both in the arrangement of the circuit system and in the details of components which enter into the system without departing from the spirit and scope of this invention. Accordingly, it is intended that the foregoing disclosure and the illustrations of the drawings shall be considered only as illustrative of the principles of this invention and not interpreted in a limiting sense.

We claim as our invention:

1. In a motor torque control system, in combination, a wound-rotor induction motor, having primary and secondary windings, mechanically coupled to a variable load, a liquid rheostat having fixed electrodes connected to the motor secondary windings, movable electrodes for adjusting the resistance value of the liquid rheostat, supply conductors connected to the motor primary windings, a direct current pilot motor for operating the movable electrodes, a regulating direct-current generator having an output circuit, an adjustable pattern field, an adjustable regulating field, and a self-exciting field; a potentiometer connected across said output circuit and having an adjustable tap, a current transformer interconnected with a supply conductor, a rectifier connected to the output of the current transformer to thus rectify the output to produce a direct current as a function of the primary winding load current, circuit means for connecting the regulating field to the rectifier, said regulating field and pattern field being wound to produce opposing effects and the adjustment being such that for a selected load of the induction motor the direct-current output voltage will be zero, means connecting said adjustable tap to be driven in dependence of operation of said pilot motor, and circuit means including said adjustable tap for so connecting the direct-current pilot motor to said potentiometer that the direction of rotation and the speed of the pilot motor will be a function of the polarity and magnitude of the tapped voltage of said potentiometer.

2. In a system of control, in combination, a wound-rotor induction motor having a primary winding and a secondary winding, a liquid rheostat having chamber means for containing the electrolyte and having fixed electrodes in the chamber means, said fixed electrodes being connected to the secondary winding, movable electrodes disposed in said chamber means for movement relative to the fixed electrodes to thus vary the effective resistance of the secondary winding, a direct-current pilot motor for operating the movable electrodes, a direct-current generator for energizing the pilot motor, said generator having an output circuit, a pattern field energized at a selected value; a potentiometer connected across said output circuit and having an adjustable tap, and having a control field, means for energizing the control field as a function of the load current in the primary winding of the motor, said pattern field and control field being disposed on the generator to oppose each other, the excitation adjustment of the two field windings being such that zero output voltage appears across said output circuit when the induction motor is operating at a selected load current, means connecting said adjustable tap to be driven in dependence of operation of said pilot motor, and circuit means including said adjustable tap so interconnecting the pilot motor and said potentiometer that the pilot motor moves the electrodes away from each other when the load current is above the selected value and are moved toward each other when the load current is below its selected value.

3. In a system of control, in combination, a wound rotor induction motor having a primary winding connected to be energized from a suitable source of alternating current having a selected voltage and frequency and having a secondary winding provided with a liquid rheostat having relatively movable electrodes for varying the effective resistance of the secondary winding, a pilot motor for moving the electrodes of the rheostat relative to each other, and a generator having an output circuit and having two opposing field windings energized respectively at a selected constant value and a value determined by the load current in the primary winding of the induction motor, the excitation effects being so adjusted that the generator has zero output voltage at a selected induction motor load current, an adjustable impedance device connected across said output circuit, means connected to control adjustment of said impedance device in dependence of the relative position of said electrodes, said pilot motor being so coupled with the rheostat and so connected to said adjustable impedance device that the electrodes are separated upon a rise of induction motor load current above the selected load current and are moved toward each other when the induction motor load current is below said selected value, whereby the motor load current is kept substantially constant, regardless of the variations in load torque.

4. In a system of control, in combination, a wound rotor induction motor having a primary winding connected to be energized from a suitable source of alternating current having a selected voltage and frequency and having a secondary winding provided with a liquid rheostat having relatively movable electrodes for varying the effective resistance of the secondary winding, a pilot motor for moving the electrodes of the rheostat relative to each other, and a generator having two opposing field windings energized respectively at a selected constant value and a value determined by the load current in the primary winding of the induction motor, the excitation effects being so adjusted that the generator has zero output voltage at a selected induction motor load current, said pilot motor being so coupled with the rheostat and so connected to the generator that the electrodes are separated upon a rise of induction motor load current above the selected load current and are moved toward each other when the induction motor load current is below said selected value, whereby the motor load current is kept substantially constant, regardless of the variations in load torque, and adjustable impedance means controlled in dependence of electrode spacing for varying the pilot motor speed as a function of the spacing of the rheostat electrodes.

5. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current pilot motor having a constant field excitation and connected to move the movable electrodes toward, or away from, the fixed electrodes depending on the voltage applied to the armature terminals of the pilot motor, a generator having an armature winding, a pattern field, and a control field wound to oppose the effect of the pattern field, a potentiometer connected across said armature winding of said generator and having an adjustable tap, said pilot motor being connected across the tapped portion of said potentiometer, means connecting said tap to be moved by said movable electrodes, means for exciting the control field as a function of the induction motor primary load current, the excitation adjustment of the pattern field and control field being such that the generator produces zero voltage output when the induction motor primary load current is at a selected value.

6. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current pilot motor having a constant field excitation and connected to move the movable electrodes toward, or away from, the fixed electrodes depending on the voltage applied to the armature terminals of the pilot motor, a generator having an armature winding, a pattern field, and a control field wound to oppose the effect of the pattern field, a potentiometer connected across said armature winding of said generator and having an adjustable tap connected to be moved by said movable electrodes, said pilot motor being connected across the tapped portion of said potentiometer through a pair of reversely connected rectifier circuits, respective normally closed limit switches in said rectifier circuits opened selectively in the limits of electrode positions, means for exciting the control field as a function of the induction motor primary load current, the excitation adjustment of the pattern field and control field being such that the generator produces zero voltage output when the induction motor primary load current is at a selected value.

7. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current armature voltage controlled pilot motor having a constant field excitation for moving the movable electrodes toward, or away from, the fixed electrodes depending on the armature voltage applied to the pilot motor, a generator having an armature winding, a self-exciting field, a pattern field, and a control field wound to oppose the effect of the pattern field, a potentiometer connected across said generator armature winding and having an adjustable tap, said pilot motor being connected to the tapped portion of said potentiometer to be energized by the voltage thereof, through a pair of reversely connected rectifier circuits, a pair of normally closed limit switches respectively connected in said rectifier circuits and selectively opened in the respective limits of movement of said movable electrodes, a driving coupling between the pilot motor and the adjustable tap to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction motor primary load current is at a selected value.

8. In a system of control, in combination, an alternating-current motor having a primary winding energized from a suitable source of alternating-current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current armature voltage controlled pilot motor having a constant field excitation for moving the movable electrodes toward, or away from, te fixed electrodes depending on the voltage applied to the armature terminals of the pilot motor, a generator having an armature winding, a self-exciting field, a pattern field, and a control field wound to oppose the effect of the pattern field, a potentiometer connected across said generator armature winding and having an adjustable tap, said pilot motor being connected to the tapped portion of said potentiometer to be energized by the voltage thereof, through a pair of reversely connected rectifier circuits, a pair of normally closed limit switches respectively connected in said rectifier circuits, a driving coupling between the pilot motor and the adjustable tap to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction motor primary load current is at a selected value, a pair of cams coupled to the pilot motor for actuating said limit switches to open them, one cam being so actuated as to open one limit switch when the movable electrodes are at a selected relatively large distance from the fixed electrodes, and the other cam being so actuated as to open the other limit switch when the movable electrodes are at a selected relatively small distance from the fixed electrodes.

9. In a system of control, in combination, an alternating-current motor having a primary winding energized from a suitable source of alternating current and having a secondary winding having at least two terminals, a liquid rheostat having at least two chambers containing an electrolyte and having one fixed electrode in each of the two chambers, said electrodes being connected to the terminals of the motor secondary, a pair of electrically connected movable electrodes disposed one in each of the two chambers, a direct-current armature voltage controlled pilot motor having a constant field excitation for moving the movable electrodes toward, or away from, the fixed electrodes depending on the voltage applied to the armature terminals of the pilot motor, a generator having an armature winding, a self-exciting field, a pattern field, and a control field wound to oppose the effect of the pattern field, a potentiometer connected to the armature winding of said generator and having an adjustable tap, said pilot motor being connected to the tapped portion of said potentiometer to be energized by the voltage thereof, through a pair of reversely connected rectifier circuits, a pair of normally closed limit switches respectively connected in said rectifier circuits, a driving coupling between the pilot motor and the adjustable tap to decrease the potentiometer voltage on the pilot motor armature with a decrease in the spacing between the movable and fixed electrodes, means for exciting the control field as a function of the induction motor primary load current, the excitation adjustment of the pattern field and control field being such that the generator produces zero voltage output when the induction motor primary load current is at a selected value, a pair of cams coupled to the pilot motor for actuating said limit switches to open them, one cam being so actuated as to open one limit switch when the movable electrodes are at a selected relatively large distance from the fixed electrodes, and the other cam being so actuated so as to open the other limit switch when the movable electrodes are at a selected relatively small distance from the fixed electrodes, the rectifiers being so disposed in the pilot motor armature circuit that the pilot motor will be energized only through a closed limit switch so as to move the movable electrodes away from a limiting position.

10. In a system of control, in combination, an alternating-current motor having a primary circuit in use energized from a suitable source of alternating current and having a secondary circuit, said secondary circuit including a motor winding, a fixed electrode disposed at one end in an elongated chamber containing an electrolyte, and an electrode disposed in the chamber for movement within the electrolyte toward the fixed electrode or away from it to alter the effective resistance of the secondary circuit, a direct-current motor having an armature winding and having a field winding excited at a selected fixed value, driving connections for said direct-current motor for operating the movable electrode, a potentiometer having an adjustable tap, means for energizing said potentiometer, circuit means connecting a tapped portion of said potentiometer across said armature winding, and means connected to move said tap in dependence of movement of said movable electrode.

11. In a control system for a wound rotor motor having an alternating current energized primary circuit and a secondary winding circuit, the combination of a liquid rheostat connected in said secondary winding circuit and having resistance controlling movable electrodes, motor means connected to drive said movable electrodes, a potentiometer having an adjustable tap and having a tapped portion connected to energize said motor means, generator means controlled in dependence of the current in said primary circuit of said wound rotor induction motor and having an output circuit connected to energize said potentiometer, and means for driving said adjustable tap in dependence of movement of said movable electrodes.

12. In a control system for a wound rotor motor having an alternating current energized primary circuit and a secondary winding circuit, the combination of a liquid rheostat connected in said secondary winding circuit and having resistance controlling movable electrodes, motor means connected to drive said movable electrodes, a potentiometer having an adjustable tap and having a tapped portion connected to energize said motor means, generator means controlled in dependence of the current in said primary circuit of said wound rotor induction motor and having an output circuit connected to energize said potentiometer, and means connecting said adjustable tap to be driven to a minimum tapped voltage position at the minimum resistance position of said movable electrodes and to a maximum tapped voltage position at the maximum resistance position of said movable electrodes.

References Cited in the file of this patent
UNITED STATES PATENTS

| | | |
|---|---|---|
| 1,533,253 | Lewis | Apr. 14, 1925 |
| 1,669,132 | Jump | May 8, 1928 |
| 2,205,220 | Schaelchlin | June 18, 1940 |
| 2,367,025 | Huston | Jan. 9, 1945 |
| 2,377,286 | White | May 29, 1945 |